United States Patent [19]
Parrish et al.

[11] Patent Number: 5,797,214
[45] Date of Patent: Aug. 25, 1998

[54] APPARATUS FOR GROWING AND HARVESTING GRAPES

[76] Inventors: David E. Parrish, 11206 Ave. 264; Devin G. Stout, 507 S. Divisadero St., both of Visalia, Calif. 93277

[21] Appl. No.: 841,779

[22] Filed: May 5, 1997

[51] Int. Cl.⁶ ............................................. A01G 17/06
[52] U.S. Cl. ............................................. 47/47; 47/46
[58] Field of Search ............................. 47/47, 44, 45, 47/46

[56] References Cited

U.S. PATENT DOCUMENTS

| | | | |
|---|---|---|---|
| 941,894 | 11/1909 | Stetson | 47/45 |
| 3,690,033 | 9/1972 | Lewis et al. | 47/46 |
| 4,023,307 | 5/1977 | Clark et al. | 47/46 |
| 5,063,709 | 11/1991 | Whittaker | 47/46 |
| 5,638,636 | 6/1997 | Hiyama et al. | 47/44 |

*Primary Examiner*—Terry Lee Melius
*Assistant Examiner*—Yvonne R. Abbott
*Attorney, Agent, or Firm*—Dennis B. Haase

[57] ABSTRACT

The present invention relates to improvements in trellis systems for supporting growing fruit bearing vines, and in particular, to improvements in the trellis itself wherein cross member secured to a post is fitted with rotator arms at either end thereof, which rotator arms are movable about their mounting point through an acute angle of about 45° to 50°, and capable of being secured against inadvertent rotation at a predetermined position relative to the cross arm so as to permit sun to shine on the central area of the vine when the rotator arms are moved downwardly, and to permit harvesting when the arms are upright.

15 Claims, 3 Drawing Sheets

APPARATUS FOR GROWING AND HARVESTING GRAPES

The present invention relates generally to a matrix for the growth, training and harvesting of vine fruit such as grapes, and, in particular, wine grapes, and, more specifically, to an improved trellis system, which is manipulatable to permit facile growing, training, and harvesting of such grapes.

BACKGROUND OF THE INVENTION

1. Field of the Invention

The process by which quality grapes are grown and harvested and, in particular, wine grapes, has, since time immemorial, been labor intensive. The vines, and also the fruit, tend to be delicate, and they are host to a variety of predators.

In recent times, competition and rising costs of soil amendments, pesticides and herbicides have spurred interest in the development of mechanical devices for the harvesting of grapes. Since the fruit hangs from the canes, mechanical harvesting is more than somewhat difficult, unless, of course, the harvester does not care if the fruit is damaged.

Since there are obvious limits on what a mechanical contrivance can do without damaging the fruit or vines, or both, some innovators have begun anew to focus on improving the trellis system, in common use, for supporting the vines as the fruit develops and matures.

2. Overview of the Prior Art

Since at least 1874, some effort has been made to development of trellis systems which would facilitate harvest. By way of example, McDonald, in his U.S. Pat. No. 156,097, disclosed a trellis with a movable bar B, which may be angularly disposed relative to the supporting post of a vibrating trellis. The link D serves to define the angular limit of movement of the bar, which is, according to the disclosure, vibrated into position to facilitate harvest, or to permit sun to get to the fruit as it is developing.

While the disclosure suggests that the bar may be held at any desired angle, it is clear that there is only one position which the bar may assume and still support the weight of the fruit, i.e., fully extended as determined by the length of the slot in the bar. While such limited utility may have served on a vibrating trellis, and before the turn of the century, it is unsuitable in today's mechanized agriculture.

Leo Lewis, in his 1972 U.S. Pat. No. 3,690,033, devised a variation on the McDonald theme when he created movable cross arms of a tapered channel construction to accommodate a particular, but undisclosed, mechanical harvester. It is apparent that the Lewis device has only one position, and that it is swingable upwardly solely for the purposes of the harvesting process.

A far more complex, and perhaps less utilitarian, trellis is disclosed in the Hiyama et al. U.S. Pat. Nos. 5,144,768 and 5,337,514, both of which have their genesis in Application 07/442,733. The essence of the Hiyama device is the ability to implement a particular method of growth of the vines. Specifically, the cross arms are rotatable, either manually, or by means of a special tool, through 180° to permit a particular pruning technique. It is also a function of the Hiyama apparatus to position the mature fruit in a position to facilitate vine drying of the fruit into raisins.

Finally, in an unrelated agricultural pursuit, namely the growing of tomatoes, Stetson devised and patented (No. 941,894) a system for the growing of tomatoes on a matrix having movable cross arms, similar to those of McDonald, having as their purpose the protection of the vines from breakage due to the weight of the fruit.

All of the foregoing ideas may have functioned well for the purpose intended at the time of their development. None, however, would be capable of producing the results achieved by the trellis system of the present invention as an adjunct to a modern agricultural practice in a highly competitive industry.

SUMMARY OF THE INVENTION

The present invention defines improvements in trellising systems for use in the development, growth, maturation and harvesting of grapes by providing a trellis system which is sufficiently flexible to permit maneuvering of certain trellis components to facilitate the growth and harvesting of a crop. Additionally, and importantly, it permits the positioning of the movable trellis components throughout the growing cycle, and provides the means for securing the trellis in the position chosen for any specific period.

Having thus established the environment within which the present invention has particular utility, it will be observed that a principal objective of the present invention is to enable the grower to plant, development and harvest a superior quality grape and, in particular, a wine grape, efficiently and with minimal labor expense.

Another objective of the present invention is to provide a trellis system in which the individual trellis structures accommodate a grape vine in a manner which will enhance its growth and development, as well as implement harvesting with a minimum of damage to the fruit.

Yet another objective which is an adjunct to the foregoing, is the ability to position the fruit for optimum use of mechanical harvesting equipment. A further objective is the ability to reposition, from time to time, the canes and attached foliage to permit optimum exposure of maturing fruit to the sun without damage to the plant or any part thereof.

The foregoing, as well as other objects and advantages, will become apparent to one skilled in the art upon a reading of the accompanying Detailed Description of a Preferred Embodiment when taken in conjunction with the accompanying drawings, wherein:

IN THE DRAWINGS

DETAILED DESCRIPTION OF A PREFERRED EMBODIMENT

Figure 1:
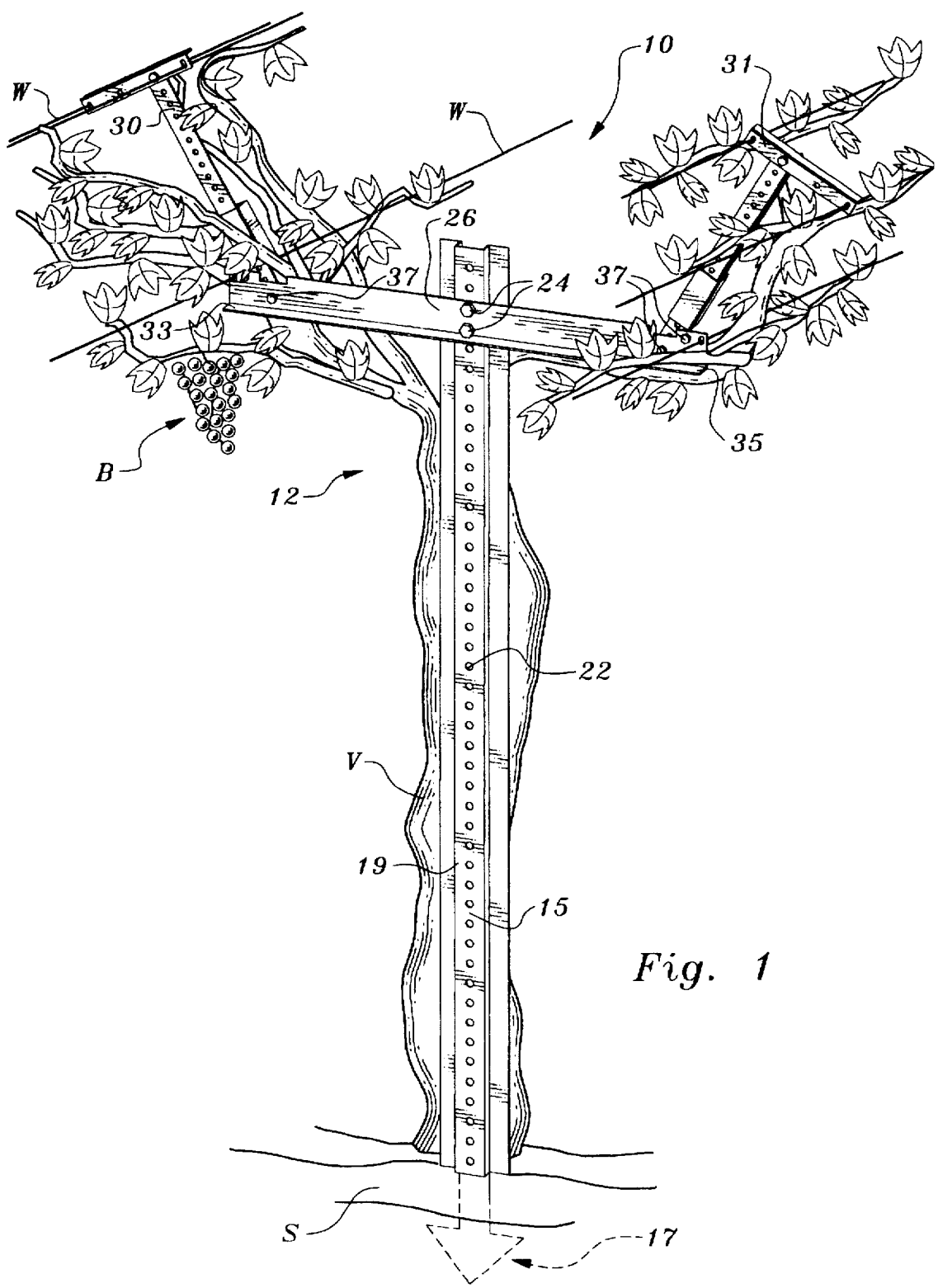
FIG. 1 is a pictorial representation of a trellis constructed in accordance with the present invention, disposed in a vineyard representing the environment in which the present invention is particularly valuable.

Referring now to the drawings and in particular, FIG. 1, a trellis system, or at least a representative portion thereof, is illustrated generally at 10.

In the system shown, a vineyard is being developed and nurtured in a field having appropriate soil S, into which vines V have been planted in rows, appropriately spaced, both longitudinally and laterally, relative to one another in a well known manner as may be reasonably necessary to accommodate the particular harvesting technique to be employed.

The trellis system comprises a series of rows of individual trellises 12, adapted to support at least one fruit bearing vine, and each of which is substantially identical in structure and dimension. Each trellis 12 is positioned in close proximity to a vine V such that each vine will readily climb its contiguous trellis and be trained thereon. Thus, the trellises are positioned in rows which are adjacent and spaced from each other laterally and longitudinally in the field in the same configuration as the vines have been planted.

Each individual trellis comprises a post 15, which post has a lower portion terminating in an end 17 thereof firmly buried in the soil S at sufficient depth as to stabilize the post 15 in an essentially vertical attitude. Such posts were, for many years, wooden. However, even when creosote is applied to the portion which is below ground, a certain amount of rot is inevitable. There has been, therefore, a steady migration to metal posts, and the present invention is, therefore, illustrated with respect to the use of metal posts and related components.

The post is formed with an upper portion above the ground, including a flattened portion defining a longitudinal face, or shank, 19 of the post is formed with an array of longitudinally aligned openings 22, over a portion of the length thereof. Each of the openings is adapted to receive a fastener, or fasteners, such as bolts 24, of a known configuration, which are employed to position and secure a cross member 26, at the optimum height along the post 15 as determined by the status of the growth of the supported vine. The longitudinal axis of the cross member 26 is transverse to the longitudinal axis of the post 15, and aligned in a plane which is parallel to the plane of the face 19, and perpendicular to a row of trellises as they are defined in the vineyard configuration.

Figure 2:
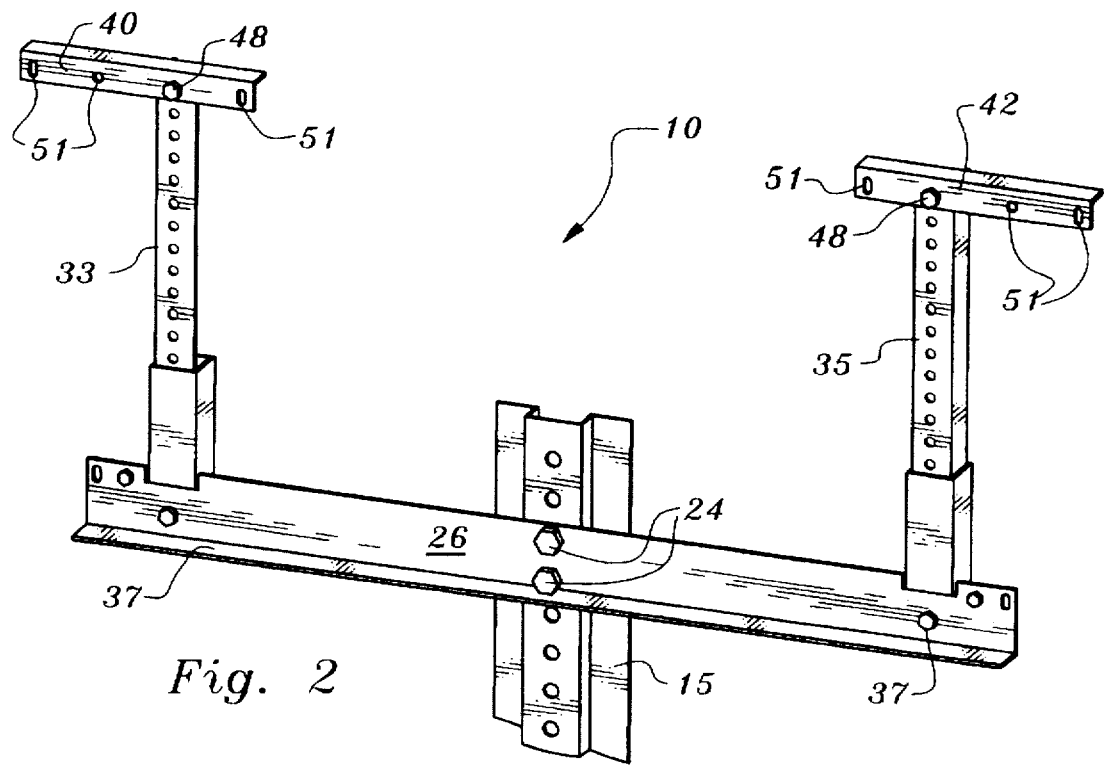
FIG. 2 is a front elevation of a trellis constructed in accordance with the present invention, having the lower portion of the post cut away, and illustrating certain details of the cross arm assembly, and viewed as it would appear if one were to look down a row of vines.
Figure 3:
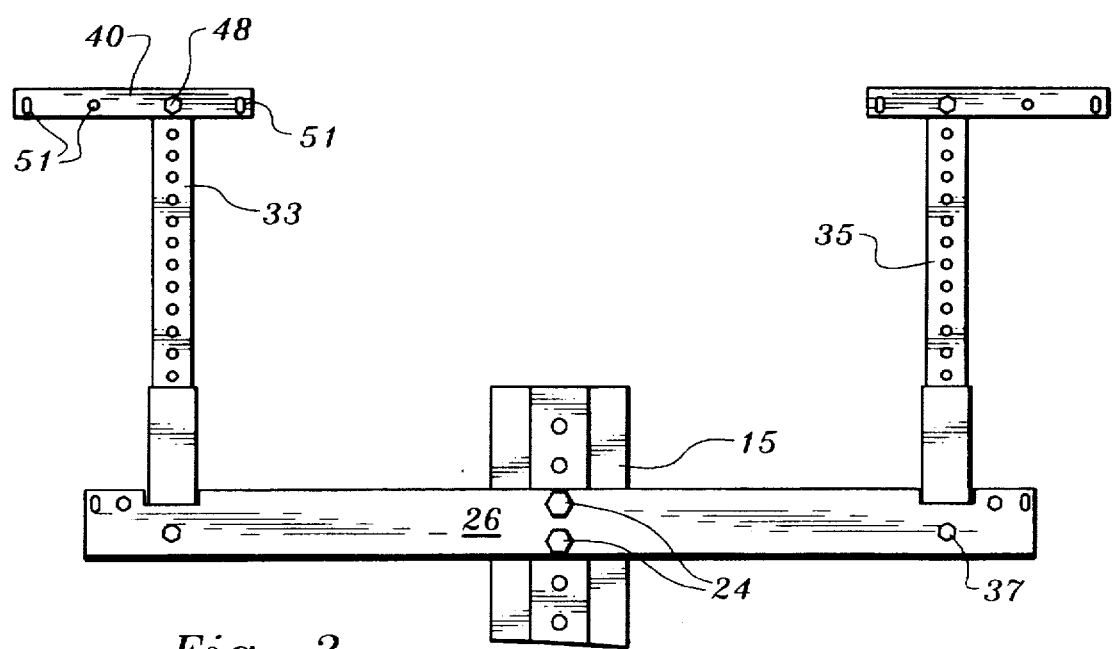
FIG. 3 is a view similar to FIG. 2 shown from the rear, and again, illustrating certain details of the cross arm assembly.
Figure 4:
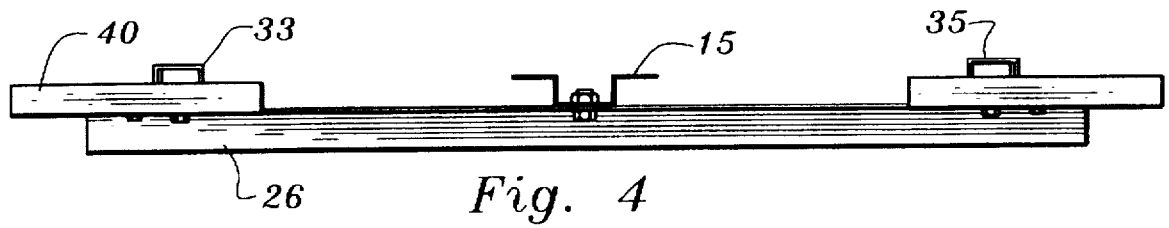
FIG. 4 is a top plan view of the cross arm assembly of FIGS. 2 and 3.

As will be seen in FIGS. 2 and 3, outboard of the connection between the post 15 and the cross member 26, rotator arms 30 and 31 are mounted for limited rotation through an acute angle, inboard of, yet in proximity to, the remote ends 33 and 35 of the cross members 26, respectively. As mounted, the rotator arms are mirror images of one another, and are, in keeping with this aspect of the invention, secured to the cross member 26 by fasteners which may be of any suitable form such as bolts 37. Each rotator arm is perforated along their longitudinal axis, as at 39, so as to provide options for positioning of complimentary components.

It will be observed that a single fastener is used in order that the rotator arm may be manipulated through a predetermined arc, between an essentially vertical attitude, outwardly to an angle of something less than horizontal. It has been found that rotation between 40° and 90° provides a very adequate range of movement for the purposes of the invention.

Each of the rotator arms 33 and 35 is provided with a small, transverse extension 40 and 42, respectively, secured at the remote ends 44 and 46, by any suitable means such as fasteners 48. As will be seen in FIGS. 2 and 3, the extensions are fastened to the rotator arms 30 and 31 at a point which is offset from the center thereof, with the longer section toward the outside of the trellis. Further, each of the extensions 40 and 42 are provided with one or more apertures 51. These apertures are positioned to receive one of several wires W. The wires W have been an integral part of trellis systems for as long as such systems have been in use. The wires extend from one end of a row of trellises to the other, and are anchored in a well known manner not specifically illustrated.

The wires serve several purposes, among them the positioning and support of each individual trellis, and, further, the wires provide a convenient means of training and supporting the canes of the vine which may grow to a length of six feet, since as the fruit thereon matures, the weight of the bunches B of grapes becomes significant.

Figure 5:
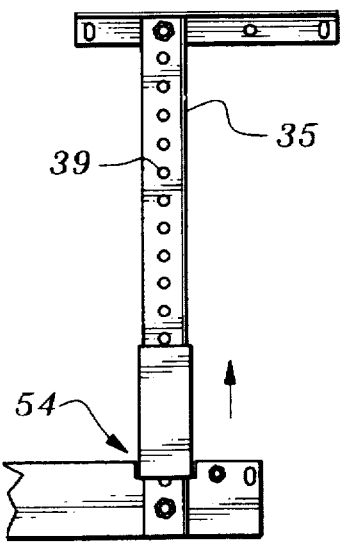
FIG. 5 is a side elevation of the relationship of the cross arm and the rotator arm, and illustrating the latter in its vertical and locked position.

In accomplishing the several objectives of the present invention, the interaction of the rotator arm relative to the cross member 26 is characterized by the ability to stabilize, indeed lock, the rotator arm in the desired position. This is achieved by means of a simple and easily manipulated locking device indicated generally at 53, and best seen in FIGS. 5, 6 and 7.

Figure 6:
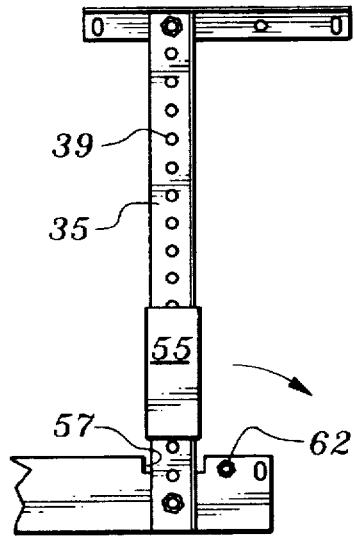
FIG. 6 is a view similar to FIG. 5, and illustrating the locking mechanism in the disengaged position.

Thus, focusing on FIG. 6, the rotator arm 35 shown in that figure is circumscribed by a locking mechanism referenced generally at 54, which includes a sleeve or tube 55, which is slidable along at least a portion of the length of each of the rotator arms 30 and 31.

The sleeve 55 is, in accordance with this aspect of the invention, manipulated to constrain or lock the rotator arm in its fully upright or vertical position, and to compliment the action of the cross member. The cross member 26 is formed, or otherwise provided with a notch 57, which is more readily apparent in FIG. 7. The width of the notch 57 is such as to permit the sleeve 53 to to fit comfortably, but snugly within the notch, and it is positioned centrally over the fastener or bolt 37, thereby extending an equal distance on either side thereof. It will now be seen that when the rotator arm 31 is upstanding in its perpendicular or vertical attitude, and the sleeve is readily moved by a worker with minimal effort, to a position wherein it is nestled within the confines of the notch 57, where it secures the rotator arm 30 and 31 in its upright position such that it can not be moved without dislodging the sleeve 55, or by using force which could damage the unit.

Figure 7:
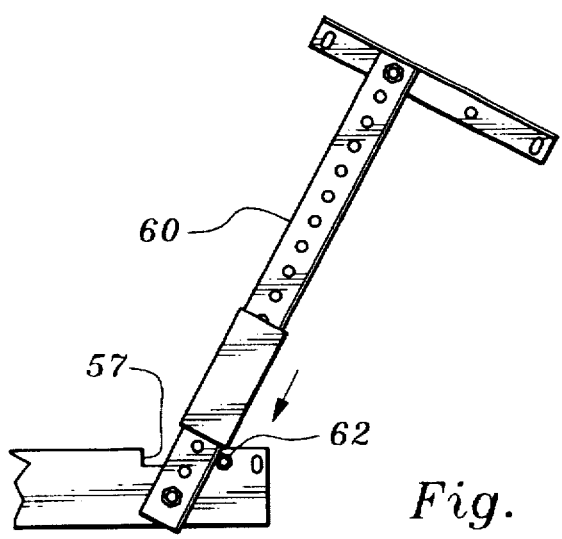
FIG. 7 is yet another view similar to that of FIG. 5, and illustrating the rotator arm in its expanded position.

In order, in keeping with the invention, that the rotator arm 31 may be rotated about the fastener 37 to the position seen in FIG. 7, a worker need only lift the sleeve 55, and apply minimal pressure to the inside edge 60 of the rotator arm to cause the rotator arm to move clockwise, in the case of rotator arm 30, and counterclockwise as to rotator arm 30, (as seen in FIG. 1 )each toward the outside of the trellis 12.

Since, however the wires and the weight of the vines V will tend to force the rotator arm downwardly, which could adversely effect the maturing fruit, such as by exposing it to too much sun, it is necessary to be able to secure the rotator arm in a predetermined position such as seen in FIG. 7. This is readily accomplished, in keeping with this facet of the invention, by providing a stop 62, in any desired position outboard of the notch 57. By so doing, the sleeve 55 will contact and come to rest on the stop 62 when the rotator arm is at the desired angle relative to vertical.

Many important objectives of the invention are thus accomplished by the ability to adjust the position of the rotator arms 30 and 31. For example, by setting the position of the rotator arm in the vertical position at the beginning of the growing season, in the facile manner described, the grower accomplishes several useful benefits, among them, capturing new shoots or canes as they emerge from the vine.

Thereafter, as growth is established and the shoots or canes are trained on the trellis system, the center of the growth may be opened by disengaging the sleeve 55 from the notch, thereby permitting the rotator arm to move against the stop 62. In consequence of the change in position, sun will be permitted to shine on the developing fruit, accelerating growth, maturity and sugaring, and, additionally, making pruning to the extent needed, easier.

Finally, at harvest time, the rotator arms 30 and 31 are moved upwardly to their vertical position, and mechanical or even manual harvesting is implemented and becomes significantly less labor intensive.

It will be appreciated by those skilled in the art that the various components of the present invention may be varied somewhat within a range of equivalents without departure from the invention.

Having thus described a preferred embodiment of the present invention, what is claimed is:

1. In a trellis system in which a plurality of trellises are aligned in parallel rows, and having wires extending the length of each of the rows and being attached to each trellis, the improvement comprising:

a trellis, said trellis comprising an upstanding post, said post having a lower portion, said lower portion being secured in soil, and having an upper portion remote from said lower portion;

a cross member rigidly affixed to said post in said upper portion, said cross member being aligned in a plane transverse to the line of said trellises which comprise a row within the trellis system; said cross member being affixed to said post in the center thereof, and having remote ends extending to either side thereof;

rotator arms; a said rotator arm secured to each of said remote ends of said cross member, each said rotator arm being rotatable through an acute angle relative to said cross member;

means for selectively locking said rotator arm in an upright position, and stop means for limiting rotation of said rotator arm when the same is unlocked;

said locking means including a notch said notch being formed in said rotator arm; a slide, said slide being disposed about said rotator arm, and being aligned such that it may be selectively fitted into said notch to secure said rotator arm in its upright position.

2. The trellis system as set forth in claim 1, wherein said rotator arms of each trellis are rotatable through an acute angle of up to 48°.

3. The trellis system as set forth in claim 2, wherein said rotator arms of each trellis are rotatable through an acute angle of 45° to 48°.

4. The trellis system as set forth in claim 1, wherein there is provided stop means, said stop means disposed on said cross member, said stop means being aligned with said rotator arm to prevent movement thereof beyond a predetermined angle relative to its upright position.

5. The trellis system as set forth in claim 1, wherein there is provided stop means, said stop means disposed on said cross member, said stop means being aligned with said rotator arm to prevent movement thereof beyond a predetermined angle relative to its upright position.

6. The trellis system as set forth in claim 1, wherein said rotator arm is secured to said cross member by means of a fastener, and said notch being formed on said cross member and extending equally on either side of said fastener.

7. The trellis system as set forth in claim 1, wherein an extension is affixed to each rotator arm, said extension being affixed at a point which is remote from the connection of said rotator arm to said cross member.

8. In a trellis for supporting a fruit bearing vine system in which a plurality of trellises are aligned in parallel rows, and having wires extending the length of each of the rows and being attached to each trellis, the improvement comprising:

a trellis, said trellis comprising an upstanding post, said post having a lower portion, said lower portion being secured in soil, and having an upper portion remote from said lower portion disposed above the ground, and a relatively flat face formed along the longitudinal axis thereof;

a cross member, said cross member being rigidly affixed to said post in said upper portion, said cross member being aligned disposed in a plane transverse to said face of said post, the line of said trellises which comprise a row within the trellis system; said cross member being affixed to said post in the center thereof, and having remote ends extending to either side thereof;

rotator arms; a said rotator arm secured for limited rotation to each of said remote ends of said cross member, each said rotator arm being rotatable through an acute angle to a substantially vertical position relative to said cross member;

a transverse extension secured to said rotator arm;

means for selectively locking said rotator arm in an upright position, and stop means for limiting rotation of said rotator arm when the same is unlocked.

9. The trellis system as set forth in claim 8, wherein said rotator arms of each trellis are rotatable through an acute angle of up to 48°.

10. The trellis system as set forth in claim 8, wherein said rotator arms of each trellis are rotatable through an acute angle of 45° and 48°.

11. The trellis system as set forth in claim 8, wherein said means for locking said rotator arm includes a notch, said notch being formed in said rotator arm; a slide, said slide being disposed about said rotator arm, and being aligned such that it may be selectively fitted into said notch to secure said rotator arm in its upright position.

12. The trellis system as set forth in claim 8, wherein the is provided stop means, said stop means disposed on said cross member, said stop means being aligned with said rotator arm to prevent movement thereof beyond a predetermined angle relative to its upright position.

13. The trellis system as set forth in claim 8, wherein there is provided stop means, said stop means disposed on said cross member, said stop means being aligned with said rotator arm to prevent movement thereof beyond a predetermined angle relative to its upright position.

14. The trellis system as set forth in claim 8, wherein said rotator arm is secured to said cross member by means of a fastener, and said notch being formed on said cross member and extending equally on either side of said fastener.

15. The trellis system a set forth in claim 8, wherein said rotator arms are adjustable.

* * * * *